Dec. 16, 1969    H. EASTON    3,484,666
SERVO SYSTEM
Filed June 20, 1966    4 Sheets-Sheet 1

INVENTOR
HAROLD EASTON

BY
Watson, Cole, Grindle & Watson
ATTORNEYS

Dec. 16, 1969  H. EASTON  3,484,666
SERVO SYSTEM

Filed June 20, 1966  4 Sheets-Sheet 2

INVENTOR
HAROLD EASTON
BY
Watson, Cole, Grindle + Watson
ATTORNEYS.

Dec. 16, 1969  H. EASTON  3,484,666
SERVO SYSTEM
Filed June 20, 1966  4 Sheets-Sheet 3
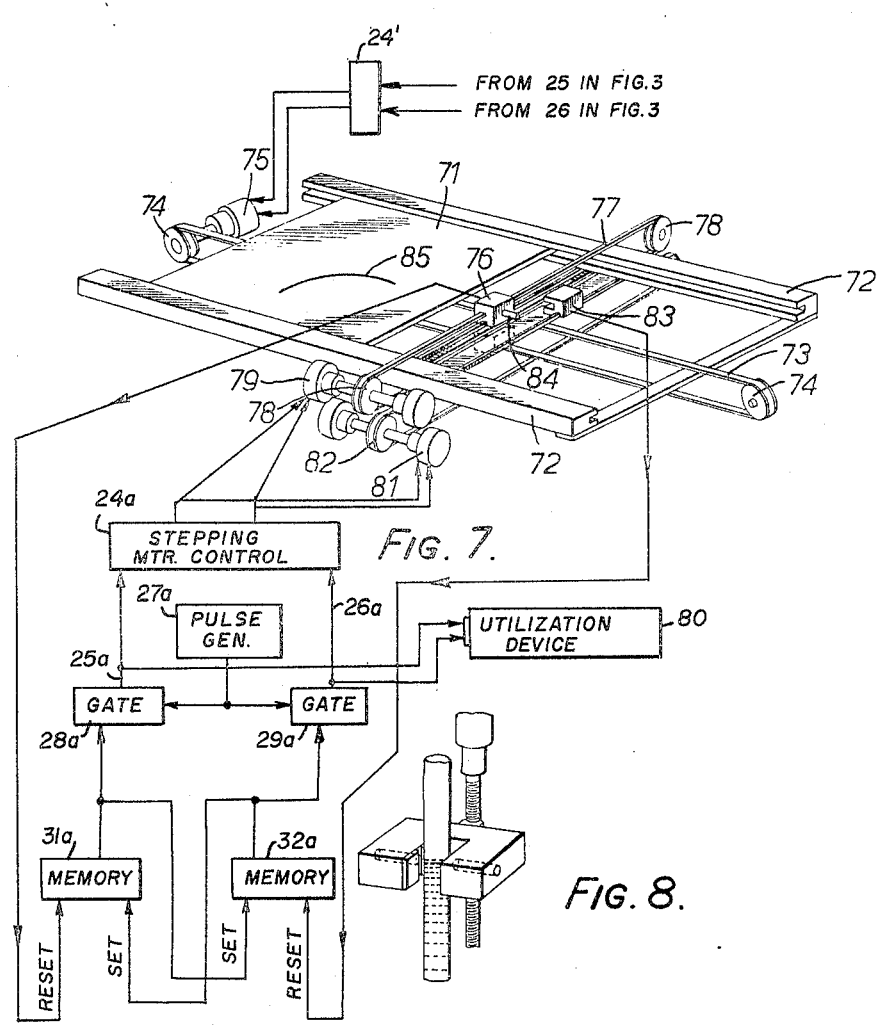
INVENTOR
HAROLD EASTON
BY
Watson, Cole, Grindle & Watson
ATTORNEYS Dec. 16, 1969  H. EASTON  3,484,666
SERVO SYSTEM Filed June 20, 1966  4 Sheets-Sheet 4

INVENTOR
HAROLD EASTON
BY
Watson, Cole, Grindle & Watson
ATTORNEYS

United States Patent Office 3,484,666
Patented Dec. 16, 1969

3,484,666
SERVO SYSTEM
Harold Easton, London, England, assignor to Warner Electric Brake & Clutch Company, South Beloit, Ill., a corporation of Delaware
Filed June 20, 1966, Ser. No. 558,950
Int. Cl. H02p 5/46, 7/68, 7/74
U.S. Cl. 318—18                 12 Claims

ABSTRACT OF THE DISCLOSURE

In a system to position a movable member, a photo-electric pick-off unit is mounted to be movable under the action of a stepping motor along a path of movement related to that of the movable member. The unit carries a photo-electric pick-off which responds when it reaches a predetermined position relative to the movable member. The system includes a source of pulses for operating the stepping motor. Circuitry, which is controlled by the pick-off, supplies the pulses to the stepping motor.

---

Figure 1:
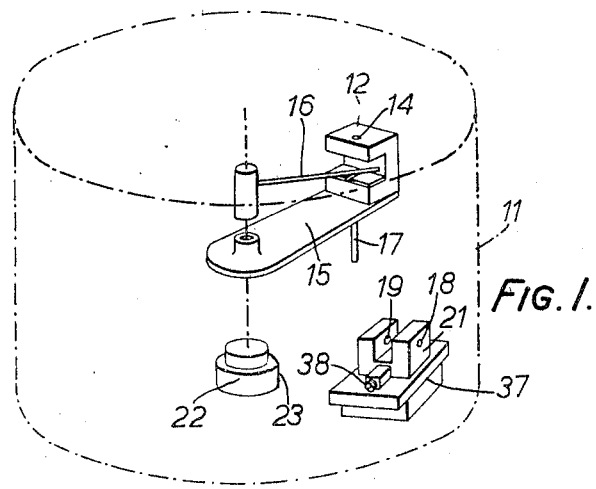

This invention relates to a metering system in which a pick-off head seeks the position of a movable member.

One particular application is to the tele-metering of the movements of instrument pointers and an instrument pointer is one form of movable member. However, the system is equally applicable to the movements of other kinds of movable member, for example an optical image or shadow of a pointer or a mercury or other liquid column in a transparent tube and the phrase movable member in this specification is to be construed widely.

According to the present invention the system includes pick-off head mounted to be movable under the action of a stepping motor along a path of movement related to that of a movable member and carrying a pick-off which responds when it reaches a predetermined position relative to the movable member, and a source of pulses for operating the stepping motor, and means controlled by the pick-off for supplying the pulses to the motor.

The stepping motor is conveniently a device with a permanent magnet rotor and a stator having windings defining various sets of poles to which pulses can be applied so that the rotor takes up successive defined angular positions in the stator, moving from one position to the next as each pulse is applied. Another form of stepping motor which is available has a permanent magnetic switch and a ferrous toothed rotor and is operated by the application of pulses to a winding on the stator. A stepping motor is available capable of operating accurately at rates of 250 pulses per second.

It is clear that the number of pulses necessary to drive the stepping motor so that the pick-off head moves from a zero position to the predetermined relative position will represent the position of the movable member and these pulses or pulses derived from them can be transmitted to a remote station.

Since it is only a number of pulses that is counted transmission can be over a great distance and can indeed be by way of a radio link.

Preferably there is a second pick-off arranged to respond to movement of the first pick-off head into a zero position.

Movement of the pick-off head might be angular or linear.

Conveniently the pick-off is of the photo-electric type so that it can operate a gate as soon as the movable member is encountered without physical action on the movable member and thus without affecting its position and in a preferred form the pick-off is responsive to infra-red radiation.

It may be noted that the pick-off does not generate the pulses but that they may be conveniently generated by a separate pulse source which can be precisely controlled as by a crystal to a predetermined frequency.

The number of pulses necessary to drive the stepping motor in a particular movement can be used either locally or remotely to operate indicators such as counter tubes or stepping motors for example for driving a repeater instrument or for driving a recording device associated with a movable chart member and indeed one set of pulses can be used to drive several different devices.

An alarm may be arranged to be given or a control operated if the number of pulses moving the stepping motor exceeds a predetermined set number of pulses.

In most cases the stepping motor will drive the pick-off arm or other devices through a reduction gear box in order that a large number of pulses can represent a small angular or linear movement and precise accuracy can be achieved. Also this would enable the effective torque to be increased. A particular gear box can be replaced by another of a different ratio in dependance on the application and indeed two stepping motors can be arranged to drive a common load each through its own gear box and this arrangement enables slack in the gear teeth to be taken up.

The equipment in general is simple and cheap because reliable stepping motors and gear boxes are cheap and yet the accuracy can be as high as desired by adjusting the physical movement of the output of the gear box corresponding to one pulse applied to the motor. Moreover the system is reliable under varying conditions of temperature and violent shock.

According to a second aspect of the invention a system includes a pick-off head mounted to be movable under the action of a stepping motor along the path of movement of a movable member and carrying a pair of pick-offs each of which responds when it is in a predetermined position relative to the movable member and a source of pulses for operating the stepping motor and means controlled by the pick-offs for supplying the pulses to the motor.

Preferably each pick-off is responsive to movement of the movable member in a different sense from a reference position relative to the head. Then one pick-off can control supply of the pulses to drive the motor in one sense and the other pick-off can control the supply of pulses to drive the motor in the other sense to cause the head to follow the movable member.

In a preferred arrangement the two pick-offs are mounted adjacent to one another to be simultaneously under the influence of a movable member in the form of an instrument pointer or the like.

The relative displacement between the movable member which might be attached to the pointer of a recording instrument and the pick-off can be accurately determined because the motor can be continually driven until the relative displacement is zero and the number of pulses necessary to effect this movement of the motor will indicate accurately the distance through which the pick-off is driven.

The pulses fed to the motor may also be fed to a remote indicating or slave stepping motor, or to a display device or counter, or to charge a capacitor. In this way the position of an instrument pointer can be reproduced remotely or can be represented on a counter as a digital quantity. In the former case, either the pick-up drive motor or the remote "slave" motor may feed its output through a gear box of appropriate ratio.

The invention embraces the idea of remotely setting an instrument pointer or the equivalent or of setting a pick-off by controlling the supply of pulses to allow a specified number of pulses to be supplied to the stepping motor.

An advantage of the invention is that the movable member need have no physical contact with the pick-off which might be a photo-electric or magnetic head so that the movable member does not impart substantial load torque to the pointer carrying the shaft. Of course the movable member can be the pointer itself.

A coded disc or drum or the equivalent could be driven by the stepping motor so that it represents at any instant the position of the pointer. It could equally be driven by another stepping motor supplied with the same pulses.

A coded disc might consist of an insulating disc having a number of conducting areas arranged in concentric circles around its centre each representing one digit of a code representing the position. For example a binary coded disc could have in each of the concentric rings alternate insulating and conducting areas representing 0 and 1 on the binary system. At an appropriate moment—usually the moment when the disc is stationary after the last driving step of the motor to bring the pick-off into the predetermined position in relation to the movable member—the coded disc can be read using a conventional technique, whether by way of brushes or optical or other means, and the coded signal can be transmitted to the remote station in one transmission without having to occupy all the time taken to step the motor round to the predetermined position.

In this way a multiplex system can be utilized whereby coded discs each for a different one of a number of measuring instruments at a station can have information of the position of the pointers transmitted to a remote station and they could all use the same line since the different coded discs can be read at different times.

Another possibility is a coded drum whose axis is coaxial with the axis about which the drum is positioned as the motor steps and with the different rings representing the different digits in the code arranged around the drum and spaced from one another axially. Again each can be read in turn possibly by stepping a reading device from one ring to the next using a stepping motor.

The disc or drum can be read while it is stationary after completion of a step of the motor due to pulse and it can be arranged that the reading head will always be in register with one or other contact of the coded disc in each of those positions so that no ambiguity arises due to reading at a point where a conducting area terminates and an insulating area begins.

This invention has particular application where an instrument whose reading is being telemetered has a non-linear scale because the series of pulses for driving the stepping motor will represent angular distance and not the scale reading itself but of course the disc or drum can be coded so that the reading which is read will take account of the non-linear scale and represent the value being indicated by the instrument.

It will be appreciated that the coded disc or drum could be positioned remotely if necessary.

The code could be a binary code for transmitting the information about the needle position in this binary code or it could merely be coded to compensate for a non-linear scale as suggested above or it could combine these effects. Other codes could be used to give an output in the form of the square or a root or a logarithm of the needle pointer reading in accordance with the requirements in a particular case.

Any movement of the pointer causes one or the other pick-off to be energised to cause the motor to drive in the appropriate direction. It is easily seen therefore that with a coded disc attached to the shaft of the follow-up arm, a coded stored reading (which can be any number whatsoever and is therefore in no way tied to the type of meter or gauge scale i.e. linear non-linear, centre, zero etc.), is always immediately available for transmission. This use of the twin pick-off follow-up arm and coded disc overcomes the disadvantage caused by attaching a coded disc to the mechanism of the gauge or meter, that the mechanism of the guage is loaded by the inertia of the coded disc or by friction of contacts. Also since, the disc moves in discrete steps, it follows that at no time need ambiguity arise due to reading at a point where one coded reading ends and the next one begins. When the disc or drum is being read, an inhibiting signal could be applied to the pulse gates to the motor so that the disc or drum is stationary in one of its discrete positions.

Although a stepping motor has been referred to, a D.C. motor or an A.C. motor perhaps operated by solid state switching might be used to cause the disc to follow up the pointer, but the stepping motor has the advantage of avoiding ambiguity in reading the disc.

An alternative to a disc or drum is a magnetic tape driven in steps by the motor, each step bearing in a magnetic code, the reading of the pointer for that step.

A checking system may be provided by having two similar movable members for indicating the same parameter independently and respective pick-offs for the similar members and means for determining the difference between the numbers of pulses required by the pick-offs to reach a triggered position from a starting position.

It is preferred that the pick-offs move as it were backwards from a starting position corresponding to a parameter value in excess of any value that will be indicated so that pulses used for driving a pick-off before a movable member is detected can be ignored and thereafter pulses can be counted until the pick-off has reached a zero position of the movable member. In this way if the two counts start at different moments it will be because there is an error in one of the duplicated sets of equipment to a system being controlled or a system for indicating and the error can be used to cut off the supply of pulses the position determined.

Figure 2:
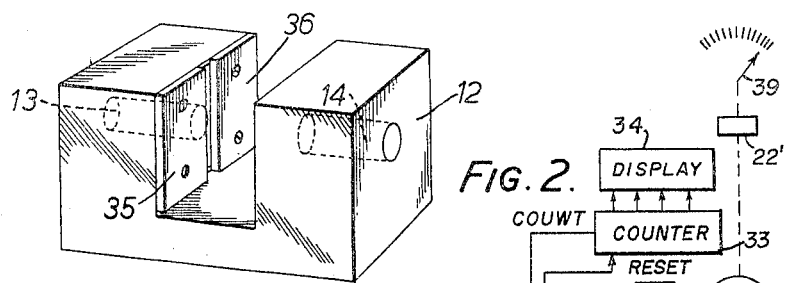
Figure 3:
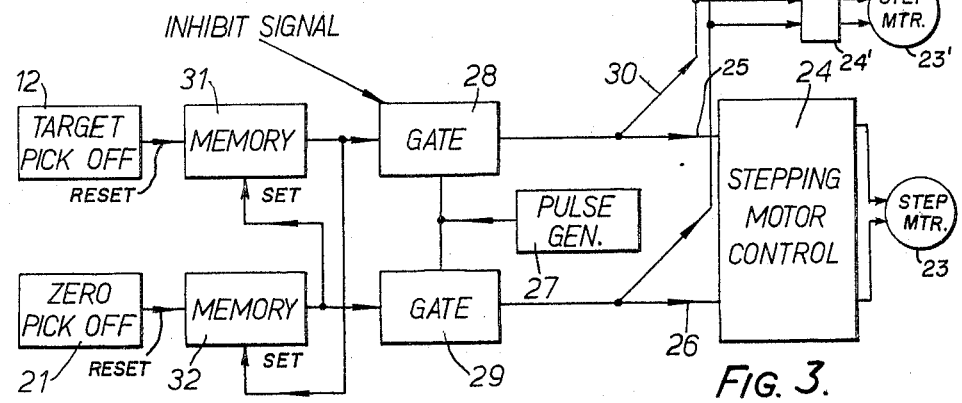
Figure 4:
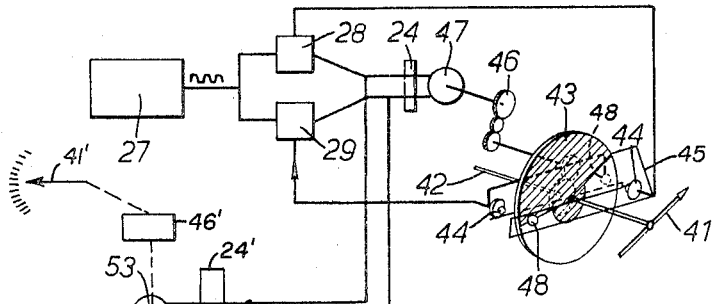
Figure 5:
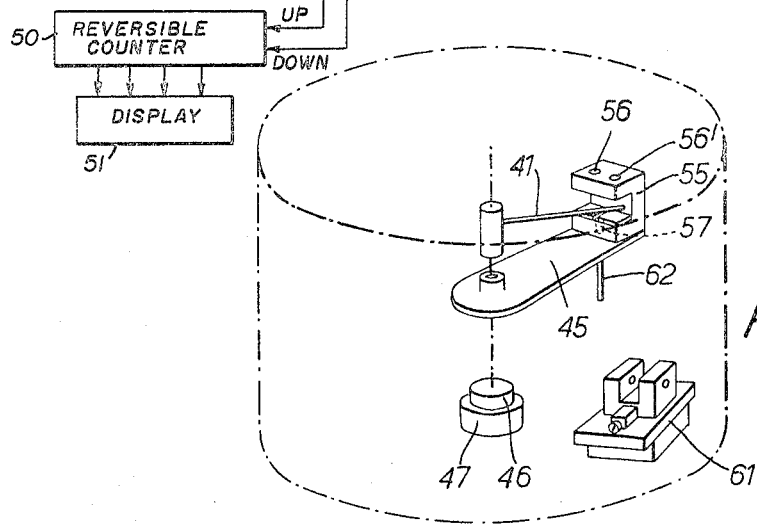
Figure 6:
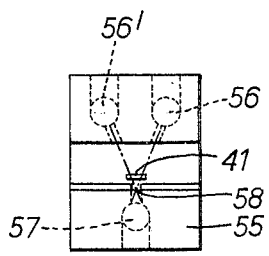
Figure 9:
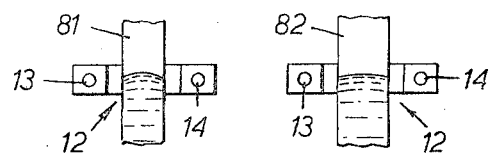
Figure 10:
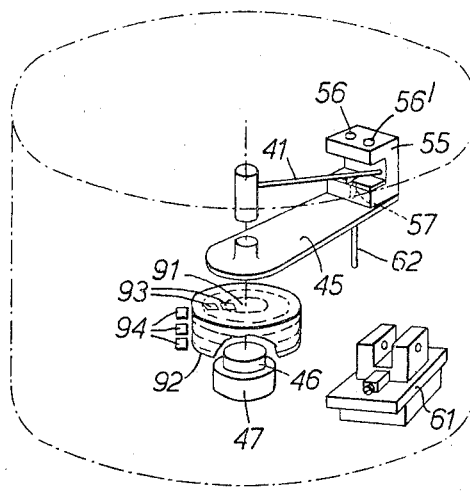

The invention may be carried into practice in various ways and certain embodiments will now be described by way of example with reference to the accompanying drawings, in which:

FIGURE 1 is a diagrammatic representation of a pick-off device embodying the invention for detecting the position of the needle of a measuring instrument, FIGURE 2 is a perspective view of a pick-off head of which two are used in the apparatus of FIGURE 1, FIGURE 3 is a block circuit diagram of the apparatus of FIGURE 1, FIGURE 4 is a diagram of another embodiment for following a pointer continuously, FIGURE 5 is a diagrammatic showing of a another embodiment of the invention similar to the embodiment of FIGURES 1–3 but embodying two pick-offs as in FIGURE 4, FIGURE 6 is a diagram showing how the instrument pointer of FIGURE 2 influences the two pick-offs, FIGURE 7 shows a further embodiment of the invention for use with a movable chart table, FIGURE 8 shows a modification of the arrangement of FIGURE 1 used for measuring the height of a column of liquid in a glass tube, FIGURE 9 shows a checking system, and FIGURE 10 shows how a coded disc or drum can be used in certain applications.

Referring now to the arrangement of FIGURES 1 and 2 it can be seen that there is fitted to the instrument shown generally at 11 a photo-electric pick-off unit 12 comprising a target pick-off head incorporating a small lamp 13 spaced from a photo-electric cell 14 and carried by an arm 15 pivotally mounted coaxially with the pointer 16 of the instrument so as to follow the path of the end of the pointer 16 with the lamp and photo-electric cell on opposite sides of that path. When the pick-off head 12 is in line with the pointer 16, which will be termed the target position, the pointer will interrupt light from the lamp 13 to the photo-electric cell 14 and produce a response from the latter.

The pick-off arm 15 also carries a member 17 which when the pick-off head 12 is in a zero position which may or may not correspond to the zero reading of the instrument, the member 17 will interrupt the light from the lamp 18 to the photo-electric cell 19 of a further pick-off head 21 referred to as the zero pick-off head.

The pick-off arm 15 is driven through reduction gearing shown generally at 22 by a stepping motor shown generally at 23 of a kind comprising a multi-pole permanent magnet rotor and a stator having a number of pairs of centre tapped coils which can be energised in different ways to cause the rotor to move one step at a time in either direction. The stepping motor 23 is energised by a suitable driver circuit or stepping motor control shown at 24 in FIGURE 3, such driver circuit being known to those skilled in the art and having two inputs 25 and 26 arranged so that when an appropriate pulse is applied to one input the motor 23 will take a step in one direction and when a similar pulse is applied to the other input it will take a step in the other direction. The motor may be capable of running at several hundred steps per second and a particular motor may have say 48 or 200 different set positions in one revolution depending upon the number of rotor poles and stator coils.

The control 24 is supplied with pulses from a generator 27 through one or other of two gate circuits 28 and 29, the repetition frequency of the generator being 250 per second.

The gates 28 and 29 are connected to the photo-electric cells of the target and zero pick-offs 12 and 21 through memory circuits 31 and 32 arranged to ensure that when the zero pick-off 21 gives a signal due to the arm 15 returning to the zero position the return gate 29 will be closed and the forward gate 28 will be opened so that the motor 23 will step the arm 15 with the pick-off 12 forward to hunt for the pointer 16. As is known to those skilled in the art, the memory circuits 31 and 32 may be bi-state devices, such as flip-flops reset when the signals from pick-offs 12 and 21 change from "light" to "dark" values, and set when the output signal from the opposite bi-state device switch from a set to a reset value. The bi-state memories 31 and 32 have their outputs connected to gates 28 and 29 so that when memories 31 or 32 are in the set state the respective gates 28 or 29 are opened. The memories 31 and 32 thus "remember" that their respective pick-off photo-cells have been darkened until the other photo-cell is darkened. When the target pick-off 12 reaches the pointer 16 and gives a signal the memory circuits 31 and 32 are actuated to close the forward gate 28 and open the return gate 29 so that the stepping motor 23 will move the pick-off head 12 on its arm 15 back to the zero position.

In these circumstances the pick-off head on its arm 15 will oscillate between a fixed zero position defined by the head 21 and a target position depending on the position of the pointer 16, and the number of pulses required to drive the motor so that the pick-off moves from the zero position to the target position will constitute a digital measure of the position of the pointer. In one convenient arrangement 800 pulses are required to move from the zero position, which in this case is also the zero position of the instrument, to the target position corresponding to full scale deflection.

In addition to producing movement of the stepping motor 23 the sequence of pulses released by the gates, or in particular the forward gate 28, may be employed for actuating any number of external indicators or other utilization devices.

In one arrangement the pulses released by the forward gate 28 are used to control a ring counter circuit 33 (FIG. 3) provided with a display device 34 containing conventional number tubes to indicate the number of pulses required to move from the zero position to the target position. Such a ring counter circuit 33 employs a conventional arrangement of cold cathode tubes to all of which the pulses are delivered and each of which when fired applies a pre-bias to its neighbour, the arrangement being such that a tube will not fire in response to a pulse alone or to the pre-bias alone but will fire in response to both together. Accordingly the tubes fire in succession in response to successive pulses and the number tubes in the display 34 are connected to them so as to exhibit a number corresponding to the last tube to fire. The pulses from input terminal 26 may be applied to the reset terminal of the counter 33. As a second or alternative utilization device shown in FIG. 3, a second stepping motor control 24' is connected to receive the pulses transmitted to input terminals 25, 26 and drives a second stepping motor 23'. The latter is connected through reduction gearing 22' to a pointer or pen 39 which thus remotely follows the movements of the arm 15.

The particular arrangement of cell unit 12 which is preferred is shown in FIGURE 2 and it consists of a plastic block generally in the form of a U with two limbs and a cross piece and each of the limbs is bored so that one can accommodate the electric lamp 13 while the other accommodates the photo-electric cell 14. The lamp directs light towards the photo-electric cell through an aperture in the side of its limb but this aperture is almost closed to leave only a very fine slot by virtue of a pair of plates 35 and 36 secured to that face of the limb. The plates can in fact be adjusted in position to give a desired zero setting of the pick-off unit and they can be set to give a line so fine that the edge of a very fine needle 16 can be readily detected by the cell 14.

In many applications it is preferred not to use visible light but infra red light and this enables the whole of the unit 12 to be coated with a black lacquer which is transparent to infra red radiation so that it enables the cell 14 to detect the presence of the needle 16 or the member 17 but does act to keep the path free from dust.

It may be noted from FIGURE 1 that the zero pick-off unit 21 is mounted on a mounting 37 for positional adjustment by use of screws 38. This is a simple way of accurately setting a desired zero position from which the arm 15 moves when it is hunting.

For efficient operation it is sometimes better if the electric circuits associated with the apparatus ensure a short delay before the arm starts to move back to the zero position after reaching the target position.

Again in another embodiment instead of having the arm 15 reciprocate between the zero position and the target position it could continue to rotate from the zero position to the target position and then on to the zero position and continuously round again.

It has been briefly stated aabove that the motor 23 drives the arm 15 through a gear box 22 and this has the effect of allowing a movement of one step by the stepping motor 23 to be made to correspond to any desired angular movement of the arm 15 by choice of an appropriate gear ratio and in fact the movement can be geared down very considerably which also means that a small motor with inherently very little torque can in fact produce reasonable torque on the arm 15.

The application described in detail always has the pick-off arm 15 hunting in one direction and in this embodiment a single pick-off, that is target pick-off, is sufficient but if in a particular arrangement hunting might be in either direction the arm could have two pick-offs and an appropriate one would be energised depending upon the direction of hunting and this would indicate the sense of displacement of the pointer from the zero position.

Again a particular instrument might have two or more pointers and then each could be detected by a different pick-off or all by the same pick-off.

In the embodiment of FIGURE 4 the pointer shaft 42, carries a light disc 43 divided almost diametrically into two portions, one transparent and one opaque. Diametrically disposed pick-offs constituted by photo-electric cells 44 are arranged on a rotatable carrier 45 driven through a gear box 46 from a servo motor 47 and in the equilibrium position the pick-offs are both energised.

Each pick-off has its own lamp 48 and is separated from it by the disc. The transparent portion of the disc slightly exceeds angularly the opaque portion so that the diametrically disposed pick-offs can both just be illuminated at once. The pick-off cells may be encased in a black plastics material which transmits infrared light, and a lamp giving off infra-red radiation will then be used.

When any movement of the instrument shaft occurs one or other of the pick-offs loses its illumination as the opaque portion of the disc comes between it and its lamp depending on which way the shaft turns.

The outputs of the two pick-offs 44 are arranged to control a pair of gates 28, 29 which may be electronic circuits of known kind including transistors. When a gate is opened in response to loss of light by its cell, pulses can be fed from a conventional pulse generator 27 continuously operating at 250 pulses per second to a switch unit 24 controlling the servo motor 47 which conveniently is a stepping motor of the kind described with reference to FIGURE 1. The switch unit 24 has two inputs, one for each direction of rotation and the effect is that an equal number of pulses supplied to each input will produce no net movement of the motor shaft.

One of the photo-electric-cell-controlled gates 28 is arranged to supply pulses to one input of the switch unit and the other 29 is arranged to supply pulses to the other input, so that, in dependance on the direction of any rotation of the disc 43, the appropriate gate will open to allow pulses to drive the motor in the sense to cause the pick-off carrier 45 to follow the shaft movement. The motor shaft is connected through 1:20 step-up gearing 46 to the photo-electric cell carrier to rotate it in the direction to follow the movement of the disc which initiated the operation and the result is that, whichever way the disc rotates, the cell carrier follows it up so that the cells remain substantially aligned along the line dividing the opaque portion from the transparent portion of the disc.

The pulses supplied through the gates 28 and 29 to the servo motor 47 are supplied through parallel connections to one or more pulse-responsive utilization devices. As shown in FIG. 4, such pulses are applied through a control 24' to another stepping motor 53 which may be remotely situated but which will repeat the movement of the servo motor 47 so that an exact remote indication can be given by a pointer 41' of the movement of the servo motor 47 which corresponds with the movement of the disc and the instrument pointer 41. also, the same pulses transmitted by gates 28 and 29 to the first and second input terminals of control 24 are coupled to the up and down inputs of a reversible counter 50 connected to a display device 51 which exhibits numerically the position of the pointer 41.

If the pointer and the disc move faster than the motor speed corresponding to the set rate of pulse generation, synchronism will only be lost momentarily because the motor will continue hunting in the right direction until it comes into synchronism again.

If it is desired that the remote indication by pointer 41' should be a proportional indication and not an exact simulation of the reading of the instrument pointer, this can be easily achieved by using a gear box 46' of different ratio between the second motor 53 and its output.

If it is undesirable to attach a disc such as 43 to the pointer shaft, the pointer itself may be used as shown in FIGURES 5 and 6.

There is only one triggered pick-off unit 55 in which are housed two pick-offs 56 and 56' and one source 57 for energising the pick-offs through a single fine slit 58.

In the static condition the pointer 41 blocks off both pick-offs and hence both gates 28 and 29 are closed and the pick-off unit remains stationary. Of course, it could be arranged that both pick-offs were energised in the static condition, and that one was cut off when the pointer moved.

However, when the pointer 41 moves, one of the pick-offs 56 and 56' will be energised (or de-energised) before the other depending upon the direction in which the pointer moves. This dependence is used to open the gate 28 or 29 (FIG. 4) which will cause the pick-off unit to follow the pointer 41, by movement of the carrier 45 by the motor 47 and gearing 46.

Initial movement of the carrier may be from a zero position defined by a pick-off unit 61 with a single lamp and cell, and an opaque finger 62 on the carrier 45, but once the pick-off 55 has found the pointer 41, it will thereafter follow it as described above so that by using two cells to distinguish between different directions of movement of the pointer, a continuous, reading can be given as distinct from the repeated reading given by the embodiment of FIGURES 1–3.

The pulses passing through the gates 28 and 29 can be used in any of the ways already described.

Now will be described some of the possible ways of using the forward or indeed reverse pulses passed by the gate 28 or 29.

In addition to controlling operation of the number tube counter 33 described above the pulses may be used to control the operation of a conventional and well known pen recorder comprising any suitable means for advancing a paper strip over a table across which a pen carriage carrying a ball pen or other marking device is mounted to slide on a pair of parallel guide rods. The pen carriage is actuated by means of a thread passing round a pulley at one side and wound around a drum at the other side. The drum is actuated through reduction gearing by a similar stepping motor (see gearing 22' and stepping motor 23' in FIG. 3) to the motor 23 or 47 driving the pick-off arm 15 or 45 and is provided with a similar stepping motor driver or control (see 24' in FIG. 3). Accordingly the drum, and therefore the pen, will precisely follow the hunting movements of the pick-off arm 15, the movement of each corresponding to the number of pulses from the zero position to the target position. The effect is to show on the paper a series of peaks returning to zero between each peak, which peaks will be of the same height if the instrument reading remains constant, and they can of course form a permanent record of the performance of the meter throughout a given time interval.

A companion head is mounted on a second pair of guide rods alongside the pen head and one or other of the heads carries a photo-electric pick-off similar to that described in FIGURE 2 while the other head carries an element causing the photo-electric cell to respond when the two heads are in line. The companion head is driven in a manner similar to the pen head but by a manual adjusting member through suitable gearing enabling it to be set to fine limits corresponding to an alarm or control device which is set to come into operation if the instrument reading exceeds the predetermined limit.

Another way of using the pulses released by the forward gate 28 and reverse gate 29 is to supply them to a driver 24' a stepping motor 53 (FIG. 4) for driving another instrument 41' through reduction gearing effectively to produce remote positioning of the second instrument repeating the reading of the instrument pointer 41 being read.

The pulses as derived from the counter tubes described above can also be used to control a numeral typer so that each reading can be logged in digital form on a continuously moving strip of paper and an observer can be given a list of various readings in digital form.

It is clear that the information from the gate 28 which is supplied to the input 25 of the stepping motor control 24 and which is also supplied over the line 30 for these various uses can be transmitted by cable over many miles or could in fact be transmitted by radio by appropriate pulse modulation of a carrier and there is little limit to the range over which information can be transmitted.

It would be very convenient in some applications if the signal could be shown as the square root of the actual reading of the pointer 16 and one method of indicating the square root will be described showing another piece of equipment associated with the invention and illustrated in FIGURE 7.

A curve carrier 71 can slide to and fro between guides 72 as driven by a cord 73 on pulleys 74 one of which is driven by a similar stepping motor and gear box 75 to that already described.

Moving transversely to the direction of movement of the curve carrier 71 is a pick-off unit 76 similar to the unit shown in FIGURE 2 and this is traversed in relation to the curve carrier by means of a cord 77 on pulleys 78 one of which is driven by a pair of stepping motors and gear boxes 79. Underneath the path of the curve carrier is a lamp co-operating with the photo-electric cell in the unit 76 through a fine transverse slot defined between two adjustable plates. The same pulses are supplied to the motor 79 driving the photocell unit 76 as are supplied to a similar motor arrangement 81 driving a pulley 82 for moving the lamp (not shown) on the other side of the slot so that in fact the cell and lamp move in synchronism transversely to the direction of movement of the curve carrier and this arrangement avoids having to have a mechanical linkage extending around the carrier.

There is also a zero pick-off unit 83 again similar to the unit shown in FIGURE 2 and co-operating with an opaque member 84 carried on the photocell unit 76 so that the photocell unit 76 and the lamp can be traversed from the zero position in response to pulses and can then be returned until the member 84 is detected by the pick-off unit 83 when it can start its traverse again.

The curve carrier 71 has drawn on it a mathematical characteristic 85 which in the example being described is a square law curve.

When a pointer reading is made by the arm 15 the same number of pulses used to drive the arm are supplied to the motor 75 to drive the transparent curve carrier 71 bearing the square law curve 85. When this movement has been completed corresponding to the setting of the pointer 16, the pick-off 76 with its lamp is traversed from the zero position until it encounters the curve 85 which is opaque on a transparent card. Since the curve in the example given is a square law curve the number of pulses necessary to drive the pick-off 76 for this purpose is equal to the square root of the number of pulses corresponding to the setting of pointer 16. The pulses derived from moving the pick-off 76, i.e., fed to step motor 79 also can be used as described above. The pick-off 76 is then returned to its zero position as is the curve carrier 85 when the arm 15 moves back to its zero position, and the process is repeated. The circuitry for supplying pulses to the motors 79 and 81 is like that shown in FIG. 3 and identical components are labelled with the same reference characters to which the distinguishing suffix *a* is added. The pulses passed by gates 28′ and 29′ are fed to a utilization device 80.

It will be clear that different characteristics from the square law characteristics can be displayed on the carrier 71.

Other uses of the apparatus of FIGURE 7 will come to mind. For example any desired curve can be drawn by supplying appropriate numbers of pulses to the carrier 71 and to a pen carried in place of the pick-off unit 76 while a particular curve can be analysed into X and Y pulses corresponding to each point on it by recording the numbers of pulses necessary to drive the motors 75 and 79 to bring the pick-off 76 into line with points on the curve.

A large number of instruments such as 11 can be read whether all in one place or all in different places and the pulses necessary for driving the arms 15 can be supplied to a central information station.

A central control can be used merely by operating switches for ordering a particular reading of a particular meter or repeated cyclic reading of that meter or any combination of meters and also for determining how each particular set of readings is used or otherwise displayed.

It is clear that the basic principle of using pulses from a separate source for driving a stepping motor until a pointer reading is encountered is capable of very many applications. The stepping motor and gear box are very cheap and yet using the type of pick-off described with reference to FIGURE 2 the reading is consistently accurate and is independent of vibrations, of changes in temperature, of distance, of voltage and is reliable and repeatable. The accuracy can be determined to any given extent by use of an appropriate gear ratio and even if the member 16 being hunted is moving fast or slow in either direction as soon as it encounters the pick-off 12 the signal can be given to operate the gate 28 or 29 so that the supply of pulses is stopped.

It will be seen that the invention converts an analogue quantity (a distance) into a digital quantity.

The invention has been described particularly as applied to determining the position of an instrument pointer, but it is clear that there are other applications. Thus FIGURE 8 shows how a pick-off similar to that of FIGURE 2 can be used to detect the position of a level of liquid in a tube. For a transparent liquid, the meniscus would act like a thin pointer to interrupt the light to the photo cell at the appropriate position of the head.

FIGURE 9 illustrates a system for checking against a fault in such a system or in the measuring device. The checking system uses two similar pick-offs 12 each for indicating the level of a liquid in one of a pair of gauges 81*a* and 82*a* measuring the same quantity.

Each tube 81*a* or 82*a* is associated with a pick-off head 12 carrying a photo-electric pick-off 14 and a lamp 13 on either side of the tube so that the pick-off receives light from the lamp if the head is above the level of liquid in the tube but receives no light from the lamp if it is cut off by the liquid in the tube. Each head is mounted to be movable along the length of the tube by being mounted on a nut which can be moved along a vertical threaded rod by rotation of the rod in a manner similar to that shown in FIGURE 8.

Rotation of the rod can be effected through reduction gearing by a stepping motor, The same series of pulses is supplied to the two motors, one for driving each pick-off head.

When a measurement is to be made the pick-off heads are positioned together at the top of the two columns of liquid at a level above the highest level to be measured, and when pulses start to be delivered to the two motors the motors step round turning their threaded rods so that the heads move down in fine steps until when a head has its light cut off as it encounters the level of liquid a gate can be opened as controlled by the output from the pick-off, and the remaining pulses needed to drive the motors to move the pick-off head to the bottom of the tube corresponding to a datum level of liquid can be fed to an indicating device or a repeating instrument in the manner described above.

If both duplicated sets of equipment are operating correctly of course each pick-off head will encounter the level of liquid in its tube at the same pulse and the total number of pulses counted will be the same, but if there is any error in either detector this will be shown up as a different number of pulses for the two heads to reach their liquid levels and any difference can be used to prevent further pulses being supplied to the indicating device or repeating instrument and so prevent a false reading being given.

If the liquid is mercury, it will cut off light to the pick-off but if say it was water, the meniscus would act similarly to cut off the light. Instead of a threaded driving rod, a pulley and wire cord could be used to drive a head from a stepping motor.

FIGURE 10 shows how the stepping motor—or another stepping motor supplied with the same pulses—can be used to position a coded disc 91, or drum 92 (shown as the same thing), or the equivalent, so that when the pick-offs 56, 56', reach the predetermined position in relation to the movable member 41 the disc or drum will have a corresponding position and this position can be "read" by conventional means 93 or 94 for reading coded discs or drums. The control circuitry for supplying pulses to the stepping motor 47 in FIG. 10 may be identical to that shown in FIG. 4 for supplying pulses to the motor 47 which appears in FIG. 4 or FIG. 5.

A coded disc 91 consists of an insulating disc having a number of conducting areas arranged in concentric rings around its centre each representing one digit of a code representing the position. For example a binary coded disc could have in each of the concentric rings alternate insulating and conducting areas representing 0 and 1 on the binary system. At an appropriate moment—usually the moment when the disc is stationary after the last driving step of the motor to bring the pick-off into the predetermined position in relation to the movable member—the coded disc can be read using a conventional technique, whether by way of brushes or optical or other means, and the coded signal can be transmitted to the remote station in one transmission without having to occupy all the time taken to step the motor round to the predetermined position.

In this way a multiplex system can be utilized whereby coded discs each for a different one of a number of measuring instruments at a station can have information of the position of the pointers transmitted to a remote station and they could all use the same line since the different coded discs can be read at different times.

Another possibility is a coded drum whose axis is coaxial with the axis about which the drum is positioned as the motor steps and with the different rings representing the different digits in the code arranged around the drum and spaced from one another axially. Again each can be read in turn possibly by stepping a reading device from one ring to the next using a stepping motor.

The coded disc or drum could be driven by the output shaft of the gear box 46 driven by the stepping motor so that it moves as one member with the pick-off head. Alternatively the disc or drum could be moved by a separate stepping motor operated by the same pulses used for operating the stepping motor driving the pick-off head. In either case no load will be applied to the needle of the indicating instrument, or other movable member.

The disc or drum can be read while it is stationary after completion of a step of the motor due to pulse and it can be arranged that the reading head will always be in register with one or other contact of the coded disc in each of those positions so that no ambiguity arises due to reading at a point where a conducting area terminates and an insulating area begins.

This invention has particular application where an instrument whose reading is being telemetered has a non-linear scale because the series of pulses for driving the stepping motor will represent angular distance and not the scale reading itself but of course the disc or drum can be coded so that the reading which is read will take account of the non-linear scale and represent the value being indicated by the instrument.

It will be appreciated that the coded disc or drum could be positioned remotely if necessary.

The code could be a binary for transmitting the information about the needle position in this binary code or it could merely be coded to compensate for a non-linear scale as suggested above or it could combine these effects. Other codes could be used to give an output in the form of the square or a root or a logarithm of the needle pointer reading in accordance with the requirements in a particular case.

The use of a coded disc or drum on the shaft of the gear box which drives the follow-up arm is most advantageous when using the follow-up arm with two pick-offs of FIGURES 4, 5 and 6 other than when using the arm of FIGURE 1. Thus the follow-up arm continuously follows the pointer and only momentarily loses the pointer should the pointer suddenly move faster than the follow-up arm. Any movement of the pointer causes one or other pick-off to be energised to cause the motor to drive in the appropriate direction. It is easily seen therefore that with a coded disc attached to the shaft of the follow-up arm, a coded stored reading (which can be any number whatsoever and is therefore in no way tied to the type of meter or gauge scale i.e. linear, non-linear, centre, zero etc.) is always immediately available for transmission. This use of the twin pick-off follow-up arm and coded disc overcomes the disadvantage caused by attaching a coded disc to the mechanism of the gauge or meter, that the mechanism of the gauge is loaded by the inertia of the coded disc or by friction of contacts. Also, since the disc moves in discrete steps, it follows that at no time need ambiguity arise due to reading at a point where one coded reading ends and the next one begins. When the disc or drum is being read, an inhibiting signal could be applied to the pulse gates to the motor so that the disc or drum is stationary in one of its discrete positions.

Although a stepping motor has been referred to, a D.C. motor or an A.C. motor perhaps operated by solid state switching might be used to cause the disc to follow up the pointer, but the stepping motor has the advantage of avoiding ambiguity in reading the disc.

An alternative to a disc or drum is a magnetic tape driven in steps by the motor, each step bearing in a magnetic code, the reading of the pointer for that step.

What I claim as my invention and desire to secure by Letters Patent is:

1. In a system for responding to the position of a member movable along a first predetermined path, the combination comprising a pick-off head, means mounting said head with freedom for movement along a second path parallel to said first path, said pick-off head carrying sensing means for producing a first control signal only when said head is substantially aligned with the movable member and a second control signal only when said head is misaligned relative to said member, a stepping motor drivingly connected to said head to move the latter in finite steps along said second path in response to successive pulses applied to an input terminal, a source of recurring pulses, means responsive to said second control signal for transmitting pulses from said source to said input terminal, a utilization device, and means for supplying one pulse to said utilization device for each pulse transmitted to said stepping motor.

2. The combination set forth in claim 1 further characterized in that said sensing means includes a photoelectric cell and a light source supported in spaced relation on said head so that light transmission from the source to the cell is interrupted by said member only when the head is aligned with the member.

3. The combination set forth in claim 1 further characterized in that said utilization device includes a pulse counter.

4. The combination set forth in claim 1 further characterized in that said utilization device includes a second stepping motor.

5. In a system for responding to the position of a member movable along a first predetermined path, the combination comprising a pick-off head, means mounting said head with freedom for movement along a second path parallel to said first path, said pick-off head carrying means for sensing the member and producing first or second control signals only when said head is displaced respectively in first or second directions from a position of alignment with the member, a reversible stepping motor drivingly connected to move said head through finite steps in a first or second direction along said second path in response to pulses applied respectively to first or second input terminals, a source of recurring pulses, means responsive to said first control signal for transmitting pulses from said source to said second input terminal, means responsive to said second control signal for transmitting pulses to said first input terminal and pulse-responsive utilization apparatus connected to receive pulses passed by said two transmitting means.

6. The combination set forth in claim 5 further characterized in that said sensing means includes two photoelectric cells and a light source mounted in spaced relation relative to the path of the member so that both cells are either illuminated or darkened only when said head is aligned with the member, one photocell producing said first control signal and the other producing said second control signal when said head is located respectively in one direction or the other from its aligned position.

7. The combination set forth in claim 5 further characterized in that said utilization device includes a pulse counter.

8. The combination set forth in claim 5 further characterized in that said utilization device includes a second reversible stepping motor.

9. In a system for responding to the position of a member movable along a predetermined path, the combination comprising a pick-off head, means mounting said head with freedom for movement along a second path parallel to said predetermined path, said pick-off head carrying means for producing a first control signal only when said head is substantially aligned with the movable member, a stepping motor drivingly connected to said head to move the latter in finite steps in first or second directions along said second path in response to successive pulses applied to first or second input terminals, a second pick-off having means for producing a second control signal only when said head is in a reference or zero position, a source of recurring pulses, means responsive to one of said control signals for transmitting pulses from said source to said first terminal until the other of said control signals appears, means responsive to the other of said control signals for transmitting pulses from said source to said second terminal until said one of said control signals appears, and a pulse-responsive utilization device coupled to receive as its input the pulses applied to at least one of said terminals.

10. The combination set forth in claim 9 further characterized in that said second pick-off is stationary at a reference or zero position, said pick-off head includes a member attached thereto, and said means for producing said second control signal includes means responsive to alignment of said attached member with said second pick-off for producing the second control signal.

11. The combination set forth in claim 9 further characterized in that said utilization device includes a counter.

12. The combination set forth in claim 9 further characterized in that said utilization device includes a second stepping motor coupled to receive the pulses transmitted to said first and second terminals, whereby the second motor repeats the motions of the first-named motor.

References Cited

UNITED STATES PATENTS

| | | | |
|---|---|---|---|
| 1,957,240 | 5/1934 | Young | 318—31 XR |
| 2,182,696 | 12/1939 | Janeway | 318—31 |
| 2,307,134 | 1/1943 | Johnson | 318—18 |
| 2,472,019 | 5/1949 | Kinderman | 318—480 XR |
| 2,484,790 | 10/1949 | Hartig | 318—31 |
| 2,734,188 | 2/1956 | Jacobs | 340—206 |
| 2,882,520 | 4/1959 | Hass | 318—480 XR |
| 3,324,369 | 6/1967 | Markakis | 318—138 |
| 3,349,785 | 10/1967 | Duffy | 318—480 XR |

BENJAMIN DOBECK, Primary Examiner

U.S. Cl. X.R.

318—138, 480